US012671157B2

(12) United States Patent
Dash et al.

(10) Patent No.: US 12,671,157 B2
(45) Date of Patent: Jun. 30, 2026

(54) STRUCTURES FOR A PHASE SHIFTER

(71) Applicant: GlobalFoundries U.S. Inc., Malta, NY (US)

(72) Inventors: Aneesh Dash, Bangalore (IN); Riddhi Nandi, Bangalore (IN); Avijit Chatterjee, Bangalore (IN); Yusheng Bian, Ballston Lake, NY (US); Pratyasha Priyadarshini, Bangalore (IN); Sujith Chandran, Clifton Park, NY (US); Rupa Gopinath Minasamudram, Bangalore (IN); Vaibhav Anantrai Ruparelia, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 82 days.

(21) Appl. No.: 18/792,790

(22) Filed: Aug. 2, 2024

(65) Prior Publication Data

US 2026/0038999 A1 Feb. 5, 2026

(51) Int. Cl.
*H01P 11/00* (2006.01)
*H01P 1/18* (2006.01)

(52) U.S. Cl.
CPC ................ *H01P 1/184* (2013.01); *H01P 1/18* (2013.01); *H01P 1/182* (2013.01); *H01P 11/00* (2013.01)

(58) Field of Classification Search
CPC .. H01P 1/184; H01P 11/00; H01P 1/18; H01P 1/182
USPC ........ 333/156, 157, 202, 204, 205, 208, 209
See application file for complete search history.

(56) References Cited

U.S. PATENT DOCUMENTS

| | | | | |
|---|---|---|---|---|
| 10,436,982 | B1 | 10/2019 | Bian et al. | |
| 2004/0264836 | A1 | 12/2004 | Kawashima et al. | |
| 2021/0247633 | A1 | 8/2021 | Chen et al. | |
| 2023/0116249 | A1 * | 4/2023 | Wang | H01P 1/181 343/850 |

OTHER PUBLICATIONS

F. Gao et al., "Comprehensive Investigation of Thermo-Optic Phase Shifters on a Multi-Layered SiN-on-SOI Platform," in Journal of Lightwave Technology, vol. 41, No. 10, pp. 3108-3114, 15 May 15, 2023, doi: 10.1109/JLT.2023.3241308.

Zheng Yong, Hong Chen, Xianshu Luo, Alperen Govdeli, Hongyao Chua, Saeed S. Azadeh, Andrei Stalmashonak, Guo-Qiang Lo, Joyce K. S. Poon, and Wesley D. Sacher, "Power-efficient silicon nitride thermo-optic phase shifters for visible light," Optics Express 30, 7225-7237 (2022).

(Continued)

*Primary Examiner* — Rakesh B Patel
(74) *Attorney, Agent, or Firm* — Thompson Hine LLP; Anthony Canale

(57) ABSTRACT

Structures for a phase shifter and methods of forming such structures. The structure comprises a phase shifter including a first section, a second section, and a strip laterally between the first section and the second section. The structure further comprises a waveguide core including a portion laterally between the first section and the second section of the phase shifter, and a dielectric layer between the waveguide core and the phase shifter. The strip is laterally offset relative to the portion of the waveguide core toward the first section of the phase shifter.

20 Claims, 6 Drawing Sheets

(56) References Cited

OTHER PUBLICATIONS

M. Rakowski et al., "45nm CMOS silicon photonics monolithic technology (45CLO) for next-generation, low power and high speed optical interconnects," in Proc. Opt. Fiber Commun. (OFC) Conf. Exhibi., San Diego, CA, USA, May 13, 2020. (SiN WG).
Y. Bian et al., "Towards low-loss monolithic silicon and nitride photonic building blocks in state-of-the-art 300mm CMOS foundry," in Proc. Frontiers Opt. (FiO), pp. paper FW5D. Sep. 2, 2020. (SiN-Si WG).
Y. Bian et al., "Monolithically integrated silicon nitride platform," in Proc. Opt. Fiber Commun. (OFC) Conf. Exhibi., Th1A.46, San Diego, CA, USA, Jun. 2021. (SiN WG).
Y. Bian et al., "Mitigating substrate leakage loss on a monolithic SiPh platform: experimental demonstration of hybrid Si-SiN waveguides for O-band datacom," 2024 Optical Fiber Communications Conference and Exhibition (OFC), San Diego, CA, USA, 2024, pp. 1-3.
Chandran, Sujith et al., "Assisted Thermo-Optic Phase Shifters" filed on May 24, 2023 as a U.S. Appl. No. 18/201,583.
European Patent Office; Extended European Search Report and Opinion issued in European Patent Application No. 24218531.2 on May 14, 2025; 9 pages.

* cited by examiner

STRUCTURES FOR A PHASE SHIFTER

BACKGROUND

The disclosure relates to photonic chips and, more specifically, to structures for a phase shifter and methods of forming such structures.

Photonic chips are used in many applications and systems including, but not limited to, data communication systems and data computation systems. A photonic chip includes a photonic integrated circuit comprised of photonic components, such as modulators, polarizers, and couplers, that are used to manipulate light received from a light source, such as an optical fiber or a laser.

A phase shifter can be used on a photonic chip to modulate the phase of light propagating in a waveguide core. One type of phase shifter may operate by a thermo-optic mechanism in which heat is transferred to the waveguide core, which has a refractive index that varies with temperature. Another type of phase shifter may operate by an electro-optic mechanism in which a p-n junction inside the waveguide core is biased. Conventional phase shifters are limited by the ability to tolerate high optical powers.

Improved structures for a phase shifter and methods of forming such structures are needed.

SUMMARY

In an embodiment of the invention, a structure comprises a phase shifter including a first section, a second section, and a strip laterally between the first section and the second section. The structure further comprises a waveguide core including a portion laterally between the first section and the second section, and a dielectric layer between the waveguide core and the phase shifter. The strip is laterally offset relative to the portion of the waveguide core toward the first section.

In an embodiment of the invention, a structure comprises a phase shifter including a first section, a second section, and a plurality of strips laterally between the first section and the second section, a waveguide core including a portion laterally between the first section and the second section, and a dielectric layer between the waveguide core and the phase shifter. The plurality of strips surround the portion of the waveguide core.

In an embodiment of the invention, a method comprises forming a phase shifter including a first section, a second section, and a strip laterally between the first section and the second section, and forming a waveguide core including a portion laterally between the first section and the second section. A dielectric layer is positioned between the waveguide core and the phase shifter. The strip is laterally offset relative to the portion of the waveguide core toward the first section.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
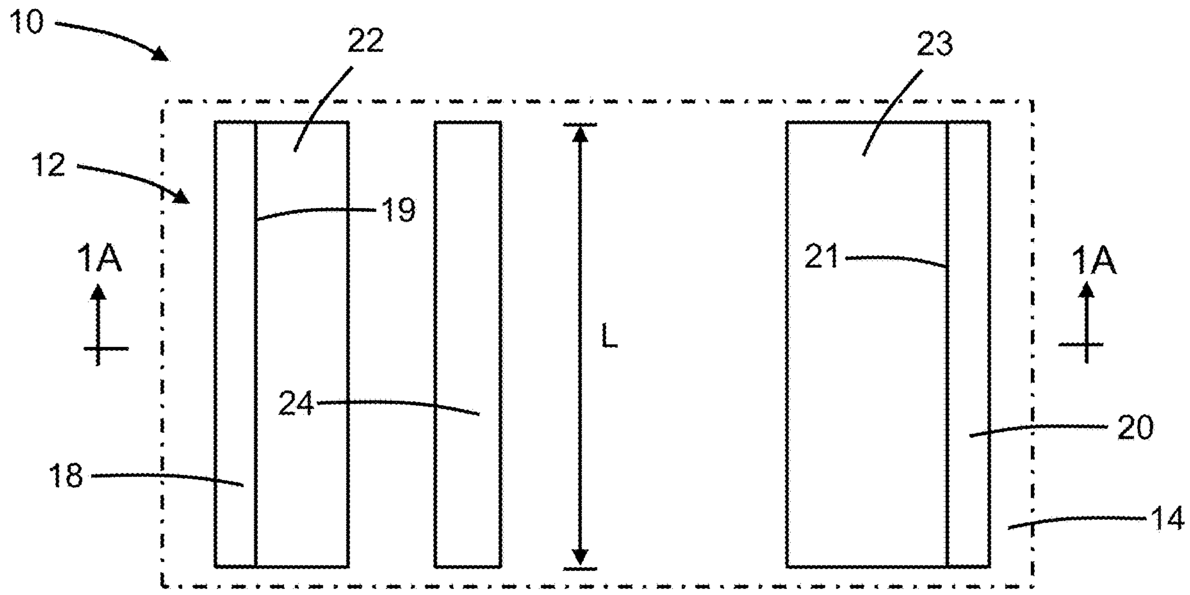
FIG. 1 is a top view of a structure at an initial fabrication stage of a processing method in accordance with embodiments of the invention.
Figure 1A:
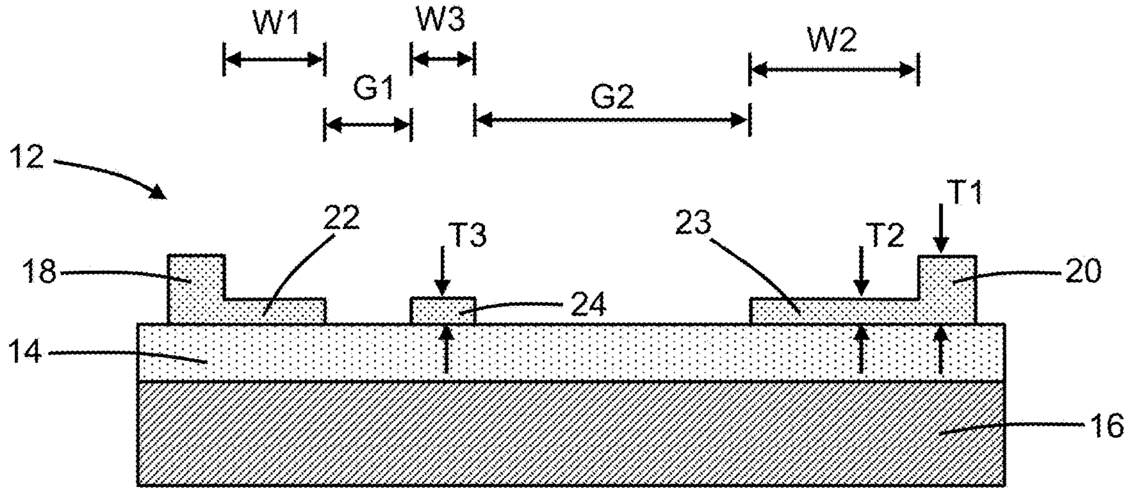
FIG. 1A is a cross-sectional view taken generally along line 1A-1A in FIG. 1.

With reference to FIGS. 1, 1A and in accordance with embodiments of the invention, a structure 10 for a phase shifter 12 includes a section 18 and a section 20 that are disposed on, and over, a dielectric layer 14 and a semiconductor substrate 16 of a photonics chip. In an embodiment, the dielectric layer 14 may be comprised of a dielectric material, such as silicon dioxide, and the semiconductor substrate 16 may be comprised of a semiconductor material, such as single-crystal silicon. In an embodiment, the dielectric layer 14 may be a buried oxide layer of a silicon-on-insulator substrate.

The phase shifter 12 further includes a slab layer 22 that extends laterally from the section 18, a slab layer 23 that extends laterally from the section 20, and a strip 24 that is laterally positioned between the section 18 and the section 20. The slab layer 22 extends laterally from a sidewall 19 of the section 18 toward the section 20, and the slab layer 23 extends laterally from a sidewall 21 of the section 20 toward the section 18.

The sections 18, 20 of the phase shifter 12 may have a thickness T1. The slab layers 22, 23 may have a thickness T2 that is less than the thickness T1 of the sections 18, 20. The strip 24 has a thickness T3 that may be equal or substantially equal to the thickness T2. The slab layer 22 may have a width W1, and the slab layer 23 may have a width W2 that is greater than W1. The sections 18, 20, the slab layers 22, 23, and the strip 24 may have a length L.

The strip 24 of the phase shifter 12 is elongated in that the length L of the strip 24 is greater than its width W3 or its thickness T2. In an embodiment, the strip 24 may be positioned closer to the section 18 than the section 20. The strip 24 is spaced from the slab layer 22 by a gap G1, and the strip 24 is spaced from the slab layer 23 by a gap G2 that may be greater than the gap G1.

In an embodiment, the section 18, the section 20, the slab layers 22, 23, and the strip 24 may adjoin the underlying dielectric layer 14. In an embodiment, the section 18, the section 20, the slab layers 22, 23, and the strip 24 may adjoin the dielectric layer 14 in a directly contacting arrangement. In an embodiment, the section 18, the section 20, the slab layers 22, 23, and the strip 24 may be positioned on a planar top surface of the underlying dielectric layer 14.

In an embodiment, the section 18, the section 20, the slab layers 22, 23, and the strip 24 of the phase shifter 12 may be comprised of a semiconductor material, such as single-crystal silicon or polycrystalline silicon. In an embodiment, the section 18, the section 20, the slab layers 22, 23, and the strip 24 may be formed by patterning the semiconductor material (e.g., single-crystal silicon) of a device layer of a silicon-on-insulator substrate with multiple lithography and etching processes. In an embodiment, the section 18 and the section 20 of the phase shifter 12 may be doped with either a p-type dopant or an n-type dopant.

Figure 2:
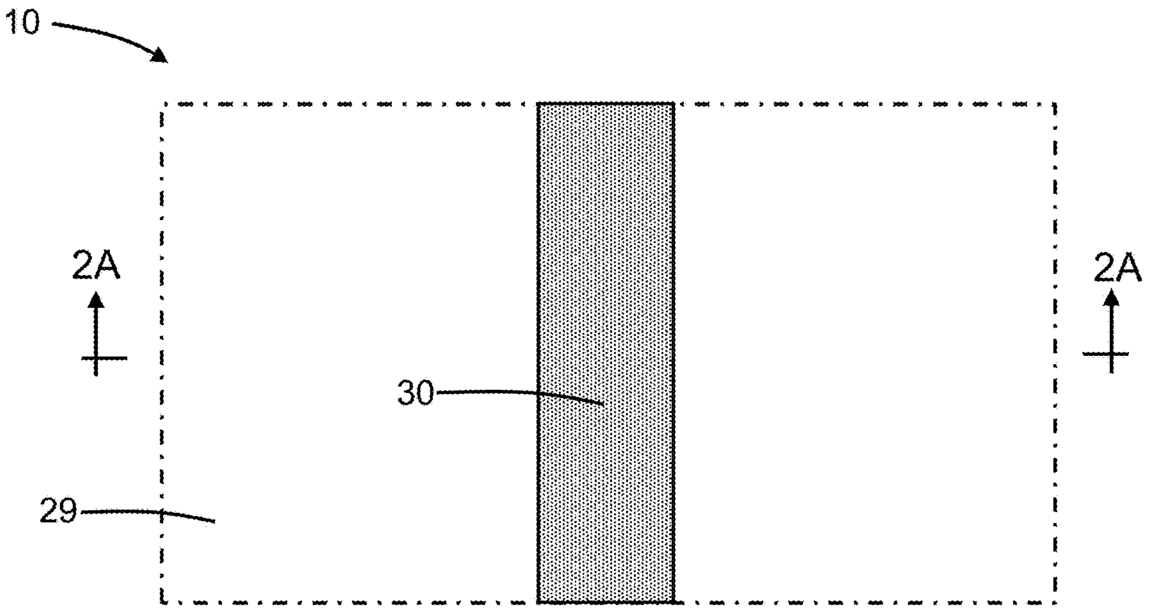
FIG. 2 is a top view of the structure at a fabrication stage of the processing method subsequent to FIGS. 1, 1A.
Figure 2A:
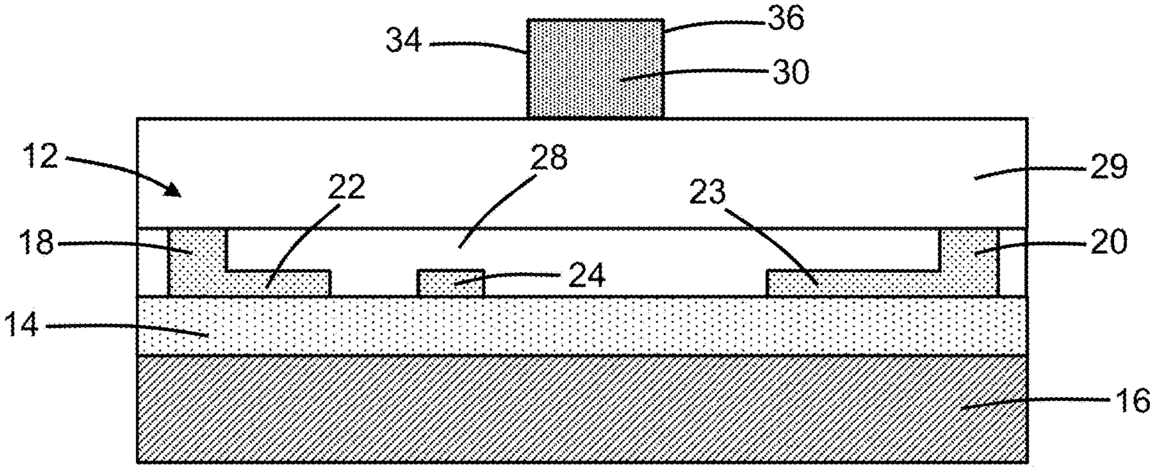
FIG. 2A is a cross-sectional view taken generally along line 2A-2A in FIG. 2.

With reference to FIGS. 2, 2A in which like reference numerals refer to like features in FIGS. 1, 1A and at a subsequent fabrication stage, a dielectric layer 28 and a dielectric layer 29 are formed on, and over, the phase shifter 12. The dielectric layers 28, 29 may be comprised of a dielectric material, such as silicon dioxide, having a refractive index that is less than the refractive index of the material constituting the section 18, the section 20, the slab layers 22, 23, and the strip 24.

The structure 10 further includes a waveguide core 30 that is positioned on, and over, the dielectric layer 29. The waveguide core 30 includes a lower surface 32 that adjoins the dielectric layer 29, an upper surface opposite to the lower surface 32, and opposite side surfaces 34, 36. The section 18, the slab layer 22, and the strip 24 of the phase shifter 12 are positioned adjacent to the side surface 34 of a portion of the waveguide core 30, and the section 20 and the slab layer 23 of the phase shifter 12 are positioned adjacent to the opposite side surface 36 of the portion of the waveguide core 30. In that regard, the sidewall 19 of the section 18 is positioned adjacent to the side surface 34 of a portion of the waveguide core 30, and the sidewall 21 of the section 20 is positioned adjacent to the opposite side surface 36 of the portion of the waveguide core 30. In an embodiment, neither of the slab layers 22, 23 extends beneath the lower surface 32 of the waveguide core 30. In an embodiment, the sections 18, 20 of the phase shifter 12 may be oriented with lengthwise alignment parallel to the adjacent portion of the waveguide core 30.

The strip 24 of the phase shifter 12 is laterally offset from the waveguide core 30 in a direction toward the section 18 such that the strip 24 is positioned closer to the section 18 than the section 20, which is reflected in the gap G1 being smaller than the gap G2. In an embodiment, the waveguide core 30 may have a non-overlapping relationship with the strip 24 due to the lateral offset providing misalignment between the strip 24 and the waveguide core 30. In an embodiment, the waveguide core 30 may have a non-overlapping relationship with the slab layer 22. In an embodiment, the waveguide core 30 may have a non-overlapping relationship with the slab layer 23. In an embodiment, the waveguide core 30 may have a non-overlapping relationship with the slab layer 22 and the strip 24. In an embodiment, the waveguide core 30 may have a non-overlapping relationship with the slab layer 23 and the strip 24. In an embodiment, the strip 24 is spaced and disconnected from the slab layers 22, 23 and the sections 18, 20 to define an island. In an embodiment, the length of the strip 24 may be aligned parallel to the length of the waveguide core 30. The strip 24 is surrounded by the dielectric material of the dielectric layer 14 and the dielectric materials of the dielectric layers 28, 29.

In an embodiment, the waveguide core 30 may be comprised of a material having a refractive index that is greater than the refractive index of silicon dioxide. In an embodiment, the waveguide core 30 may be comprised of a dielectric material, such as silicon nitride, silicon oxynitride, or aluminum nitride. In alternative embodiments, other materials, such as a polymer, diamond, thin-film lithium niobate, boron nitride, barium titanate, or a III-V compound semiconductor, may be used to form the waveguide core 30.

In an embodiment, the waveguide core 30 may be formed by depositing a layer comprised of its constituent dielectric material and patterning the deposited layer with lithography and etching processes. In an alternative embodiment, a thin slab layer may be connected to a lower portion of the waveguide core 30.

Figure 3:
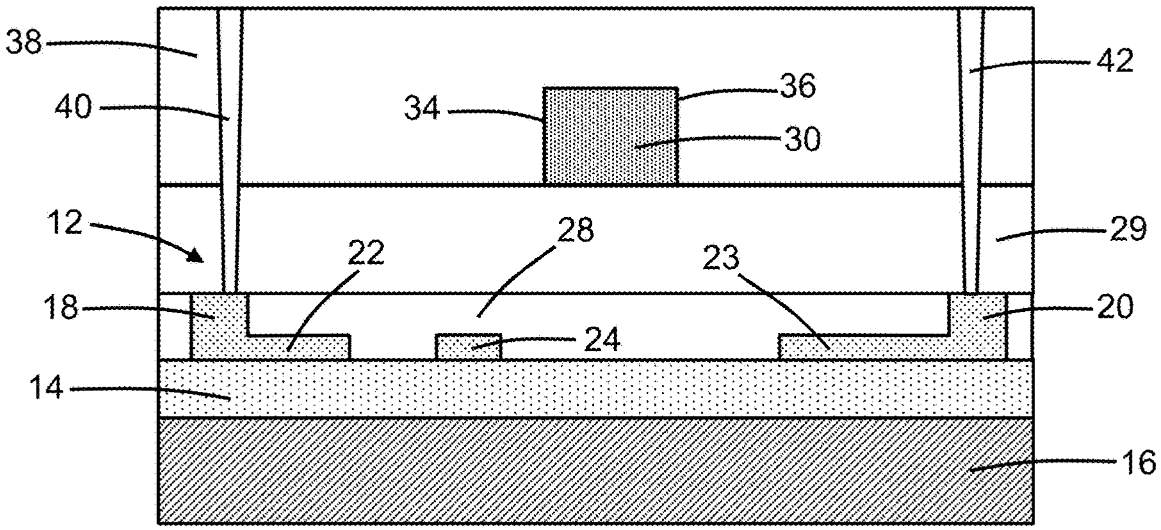
FIG. 3 is a cross-sectional view of the structure at a fabrication stage of the processing method subsequent to FIGS. 2, 2A.

With reference to FIG. 3 in which like reference numerals refer to like features in FIGS. 2, 2A and at a subsequent fabrication stage, a dielectric layer 38 is formed on, and over, the waveguide core 30. The dielectric layer 38 may be comprised of a dielectric material, such as silicon dioxide, having a refractive index that is less than the refractive index of the material constituting the waveguide core 30.

Contacts 40 are formed that are physically and electrically connected to the section 18, and contacts 42 are formed that are physically and electrically connected to the section 20. The contacts 40, 42 may be comprised of a metal, such as tungsten, that is formed in openings patterned in the dielectric layers 28, 29 and the dielectric layer 38. The contacts 40 may connect the section 18 to a power source, which can be operated to supply a current that causes Joule heating of the section 18. The contacts 42 may connect the section 20 to the power source, which can be operated to supply a current that causes Joule heating of the section 20.

In use, the waveguide core 30 confines propagating light such that the highest optical intensity region of the optical mode is associated within and immediately adjacent to the waveguide core 30. The sections 18, 20 of the phase shifter 12 may generate heat that is transferred to the slab layers 22, 23 and the strip 24. The temperature of the slab layers 22, 23 and the strip 24 is elevated by the transferred heat. The temperature change experienced by the slab layers 22, 23 and the strip 24 is effective to change the refractive index of their material through the thermo-optic effect. The light propagating in the waveguide core 30 has an evanescent tail of low optical intensity at its fringes that interacts with the slab layers 22, 23 and the strip 24. The change in refractive index of the slab layers 22, 23 and the strip 24 changes the refractive index of the entire optical mode associated with the propagating light in the waveguide core 30 and thereby alters the phase of the light propagating in the waveguide core 30. The separation of the slab layers 22, 23 and the strip 24 from the waveguide core 30, while permitting interaction to an extent sufficient to change the effective refractive index of the entire optical mode, limits nonlinear absorption.

In alternative embodiments, the phase shifter 12 may be deployed in an arm of a Mach-Zehnder modulator to provide phase shifting. In alternative embodiments, the phase shifter 12 may be deployed in a ring resonator.

The slab layers 22, 23 and the strip 24 of the phase shifter 12 may enable tuning of the phase of light propagating in the waveguide core 30 and may enhance the thermo-optic response of the waveguide core 30. The slab layers 22, 23 and the strip 24 may be comprised of a material having a significantly higher coefficient of thermal conductivity than the material of the dielectric layers 28, 29. Constructing the waveguide core 30 from a dielectric material, such as silicon nitride, may provide a power handling capability that is greater than the power handling capability of other materials, such as silicon, and may particularly benefit from the phase shifter 12 for phase shifting propagating light. The waveguide core 30 has a non-contacting relationship with the phase shifter 12 in which the waveguide core 30 is spaced from the phase shifter 12 by intervening dielectric material.

Figure 4:
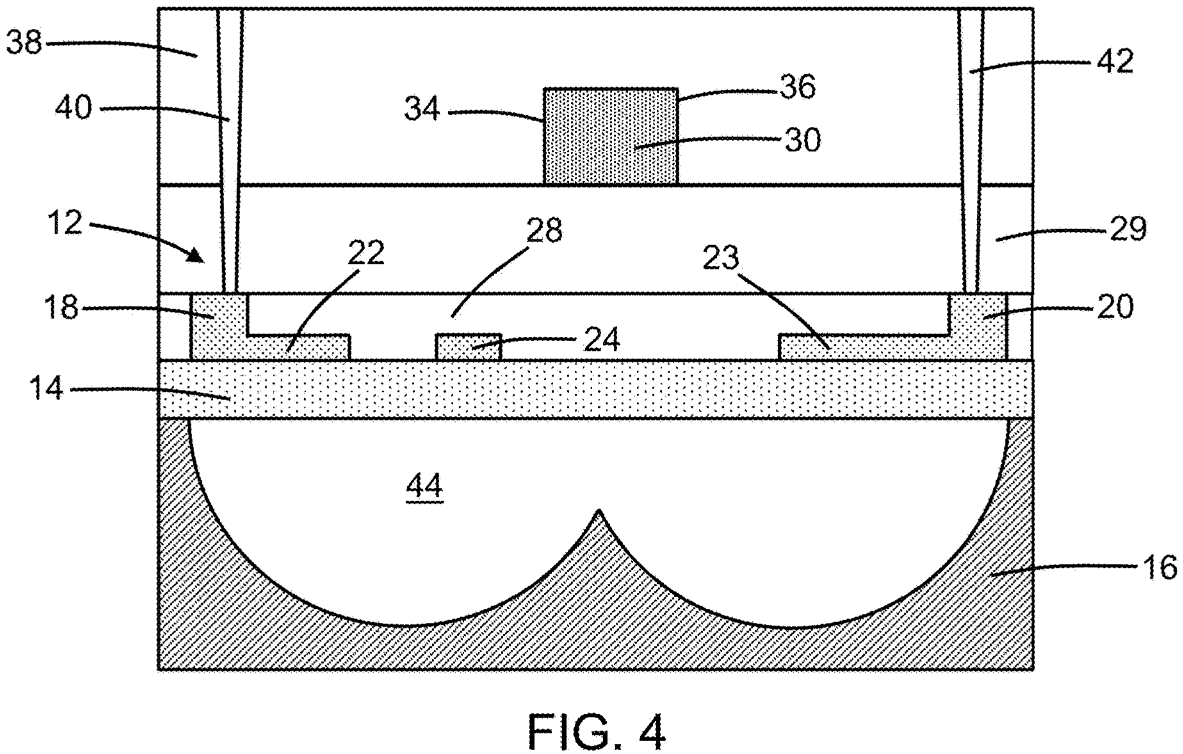
FIG. 4 is a cross-sectional view of a structure in accordance with alternative embodiments of the invention.

With reference to FIG. 4 in which like reference numerals refer to like features in FIG. 3 and in accordance with alternative embodiments, the structure 10 may be modified to add a cavity 44 in the semiconductor substrate 16. The cavity 44 may be formed by an isotropic etching process that includes a vertical etching component and a lateral etching component. The cavity 44, which may be filled by air or a different material, may provide thermal isolation of the phase shifter 12 from the bulk of the semiconductor substrate 16. In the representative embodiment, the cavity 44 may include a pair of interconnected chambers. In an alternative embodiment, the cavity 44 may include more than a pair of interconnected chambers.

Figure 5:
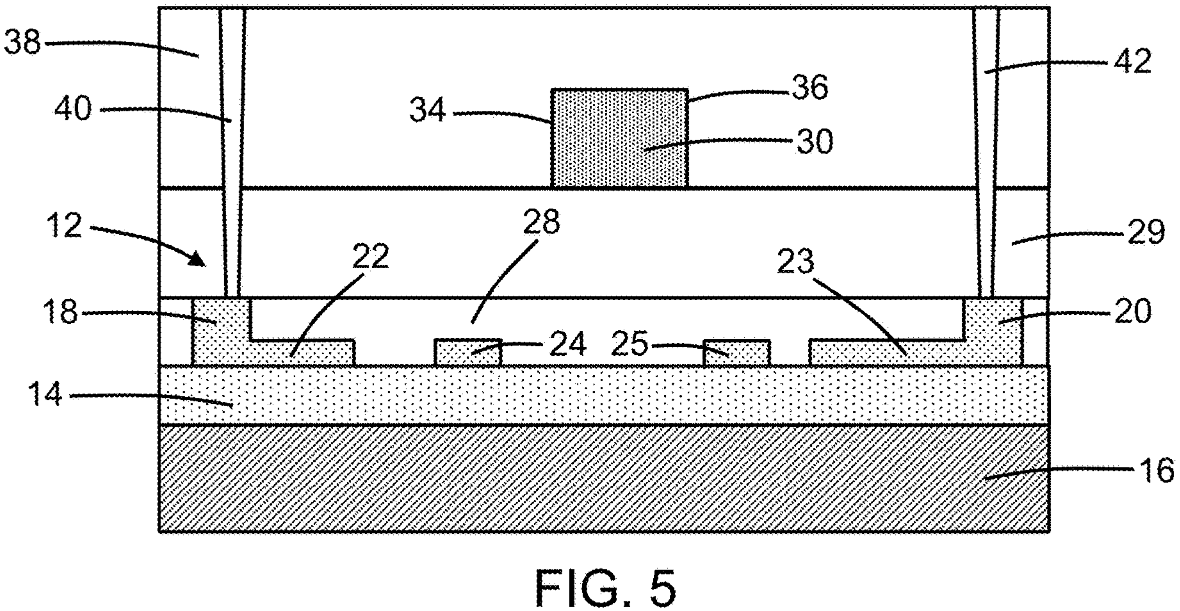
FIG. 5 is a cross-sectional view of a structure in accordance with alternative embodiments of the invention.

With reference to FIG. 5 in which like reference numerals refer to like features in FIG. 3 and in accordance with alternative embodiments, a strip 25 may be added that is laterally offset from the waveguide core 30 in a direction toward the section 20. In an embodiment, the waveguide core 30 may have a non-overlapping relationship with the strip 25 due to the lateral offset providing misalignment between the strip 24 and the waveguide core 30. In an embodiment, the waveguide core 30 may be laterally positioned between the strip 24 and the strip 25. The strip 25, which may be similar or identical to the strip 24, is disconnected from the slab layers 22, 23 and the sections 18, 20. The strip 25 may be spaced from the waveguide core 30 such that only the evanescent tail of light propagating in the waveguide core 30 interacts with the strip 25.

In an embodiment, the lengths of the strips 24, 25 may be aligned parallel to the length of the waveguide core 30. In an alternative embodiment, the strips 24, 25 may be curved with concavities facing away from the waveguide core 30 to provide a layout in which reflection may be reduced. In an alternative embodiment, the waveguide core 30 may include one or more bends that permit the waveguide core 30 to make multiple passes relative to the strips 24, 25.

Figure 6:
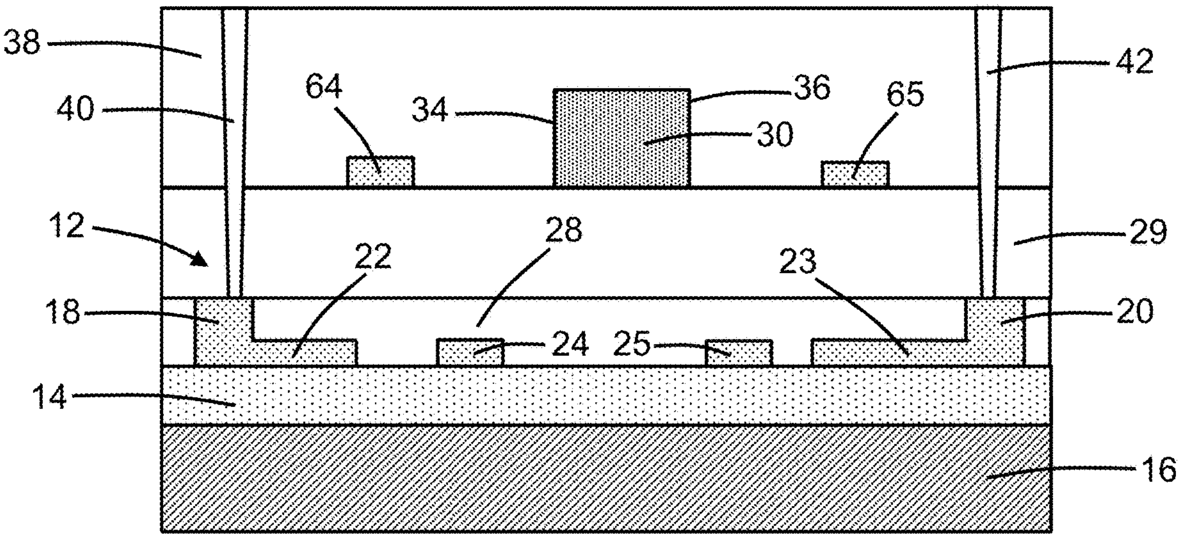
FIG. 6 is a cross-sectional view of a structure in accordance with alternative embodiments of the invention.

With reference to FIG. 6 in which like reference numerals refer to like features in FIG. 5 and in accordance with alternative embodiments, a strip 64 may be added on, and over, the dielectric layer 29 that is laterally offset from the waveguide core 30 in a direction toward the section 18 and a strip 65 may be added on, and over, the dielectric layer 29 that is laterally offset from the waveguide core 30 in a direction toward the section 20. The strip 24 and the strip 64 are positioned adjacent to the side surface 34 of the waveguide core 30, and the strip 24 and the strip 64 are positioned adjacent to the side surface 36 of the waveguide core 30. The strips 64, 65 may be spaced from the waveguide core 30 such that only the evanescent tail of light propagating in the waveguide core 30 interacts with the strips 64, 65. The strips 64, 65 may be comprised of a material, such as polysilicon, that differs from the material constituting the waveguide core 30. In an alternative embodiment, either the strip 64 or the strip 65 may be omitted. In an alternative embodiment, either the strip 24 or the strip 25 may be omitted.

Figure 7:
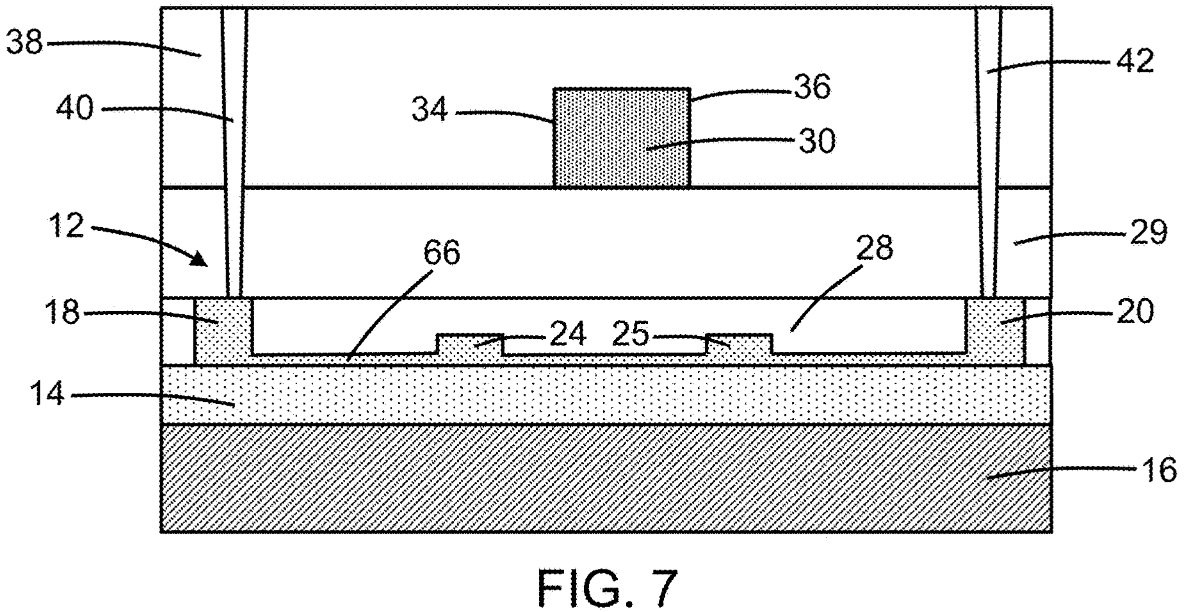
FIG. 7 is a cross-sectional view of a structure in accordance with alternative embodiments of the invention.

With reference to FIG. 7 in which like reference numerals refer to like features in FIG. 3 and in accordance with alternative embodiments, the slab layers 22, 23 may be thinned and extended toward each other to form a unitary slab layer 66 that extends from the section 18 to the section 20. The slab layer 66, which has a thickness that is less than the thickness of the strips 24, 25, is physically connected to a lower portion of each of the strips 24, 25. In an embodiment, the slab layer 66 may be continuous along the length of the sections 18, 20 and the strips 24, 25. In an embodiment, the slab layer 66 may be discontinuous to define bridges between the sections 18, 20 and the strips 24, 25 at intermittent locations along the length of the sections 18, 20 and the strips 24, 25.

Figure 8:
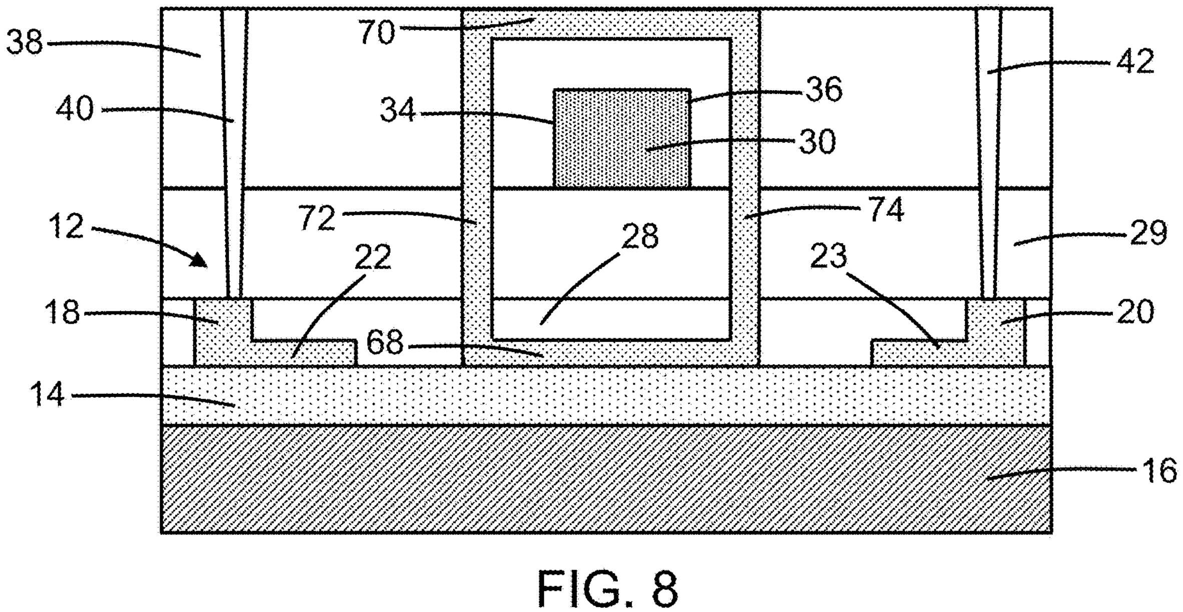
FIG. 8 is a cross-sectional view of a structure in accordance with alternative embodiments of the invention.

With reference to FIG. 8 in which like reference numerals refer to like features in FIG. 3 and in accordance with alternative embodiments, strips 68, 70, 72, 74, which are similar or identical to the strips 24, 25, may be formed that surround the waveguide core 30 on all sides. The strip 68 and the strip 70 are oriented horizontally with the strip 68 positioned between the waveguide core 30 and the semiconductor substrate 16, and the waveguide core 30 positioned between the strip 68 and the strip 70. The waveguide core 30 is laterally positioned between the strip 72 and the strip 74.

Figure 9:
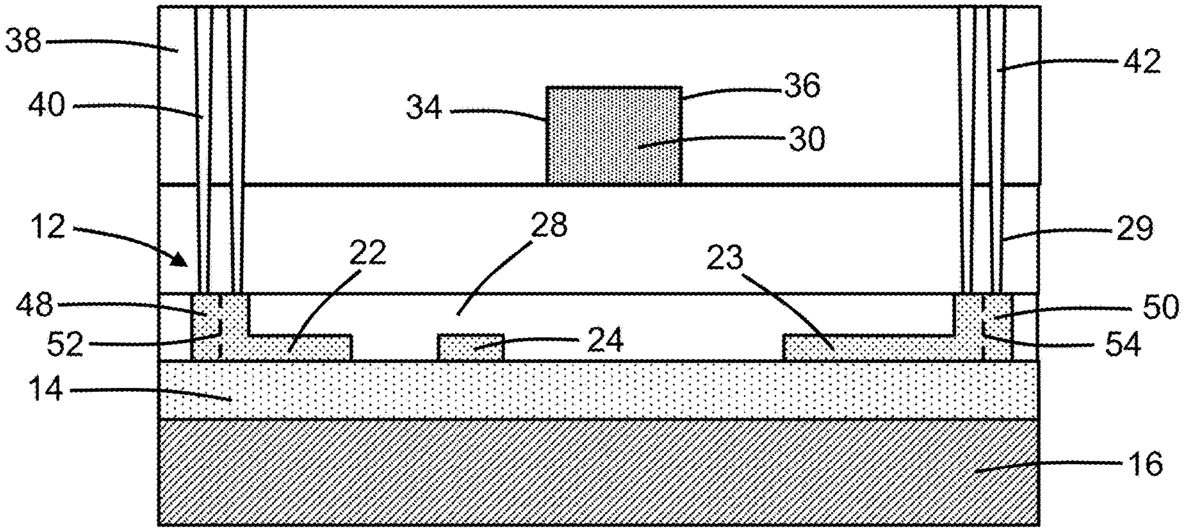
FIG. 9 is a cross-sectional view of a structure in accordance with alternative embodiments of the invention.

With reference to FIG. 9 in which like reference numerals refer to like features in FIG. 3 and in accordance with alternative embodiments, the sections 18, 20 may be respectively configured as electro-optic elements 48, 50. The electro-optic elements 48, 50 include respective p-n junctions 52, 54 that may be biased to change the refractive index of the slab layers 22, 23 and the strip 24 such that the effective refractive index of the optical mode associated with the propagating light in the waveguide core 30 is changed and thereby the phase of the light propagating in the waveguide core 30 is altered. The waveguide core 30, if comprised of a dielectric material, cannot be configured with a p-n junction. The slab layers 22, 23 and the strip 24 of the phase shifter 12 may enhance the electro-optic response of the waveguide core 30.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value or precise condition as specified. In embodiments, language of approximation may indicate a range of +/−10% of the stated value(s) or the stated condition(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal plane, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:

a phase shifter including a first section, a second section, and a first strip laterally between the first section and the second section;

a waveguide core including a portion laterally between the first section and the second section, the first strip laterally offset relative to the portion of the waveguide core toward the first section; and a first dielectric layer between the waveguide core and the phase shifter, wherein the first strip, the first section, and the second section comprise a semiconductor material, and the waveguide core comprises a dielectric material.

2. The structure of claim 1 wherein the first section and the second section are configured to generate heat.

3. The structure of claim 1 wherein the first section and the second section have a first thickness, and the first strip has a second thickness that is less than the first thickness.

4. The structure of claim 1 wherein the semiconductor material comprises silicon, and the dielectric material comprises silicon nitride.

5. The structure of claim 1 further comprising:

a semiconductor substrate including a cavity beneath the phase shifter; and a second dielectric layer disposed between the cavity and the phase shifter.

6. The structure of claim 1 wherein the phase shifter includes a first slab layer extending from the first section toward the first strip, the first section has a first thickness, and the first slab layer has a second thickness that is less than the first thickness.

7. The structure of claim 6 wherein the phase shifter includes a second slab layer extending from the second section toward the first strip, the second section has the first thickness, and the second slab layer has the second thickness.

8. The structure of claim 7 wherein the first strip is laterally positioned between the first slab layer and the second slab layer.

9. The structure of claim 8 wherein the first strip is separated from the first slab layer by a first gap, the first strip is separated from the second slab layer by a second gap, the first strip is disconnected across the first gap from the first slab layer, and the first strip is disconnected across the second gap from the second slab layer.

10. The structure of claim 6 wherein the first strip is separated from the first slab layer by a first gap, and the first strip is disconnected across the first gap from the first slab layer.

11. The structure of claim 6 wherein the first strip is separated from the first slab layer by a first gap, and the first strip is connected across the first gap to the first slab layer.

12. The structure of claim 1 wherein the phase shifter includes a second strip laterally between the first section and the second section, and the second strip is laterally offset relative to the portion of the waveguide core toward the second section.

13. The structure of claim 12 wherein the phase shifter includes a slab layer connecting the first section, the second section, the first strip, and the second strip.

14. The structure of claim 1 wherein the phase shifter includes a second strip laterally between the first section and the second section, and the portion of the waveguide core is laterally positioned between the first strip and the second strip.

15. The structure of claim 1 wherein the phase shifter includes a second strip adjacent to the waveguide core, and the first dielectric layer is positioned between the second strip and the first strip.

16. The structure of claim 1 wherein the phase shifter includes a first p-n junction inside the first section and a second p-n junction inside the second section.

17. A structure comprising:

a phase shifter including a first section, a second section, and a plurality of strips laterally between the first section and the second section;

a waveguide core including a portion laterally between the first section and the second section, the plurality of strips surrounding the portion of the waveguide core; and a dielectric layer between the waveguide core and the phase shifter, wherein the plurality of strips, the first section, and the second section comprise a semiconductor material, and the waveguide core comprises a dielectric material.

18. The structure of claim 17 wherein the semiconductor material comprises silicon, and the dielectric material comprises silicon nitride.

19. A method comprising:

forming a phase shifter including a first section, a second section, and a strip laterally between the first section and the second section;

forming a waveguide core including a portion laterally between the first section and the second section; and wherein the strip is laterally offset relative to the portion of the waveguide core toward the first section, a dielectric layer is positioned between the waveguide core and the phase shifter, the strip, the first section, and the second section comprise a semiconductor material, and the waveguide core comprises a dielectric material.

20. The structure of claim 16 wherein the semiconductor material comprises silicon, and the dielectric material comprises silicon nitride.

* * * * *